Feb. 13, 1945.  H. E. MILLS  2,369,480
THREADLESS FASTENING DEVICE
Filed Dec. 24, 1941
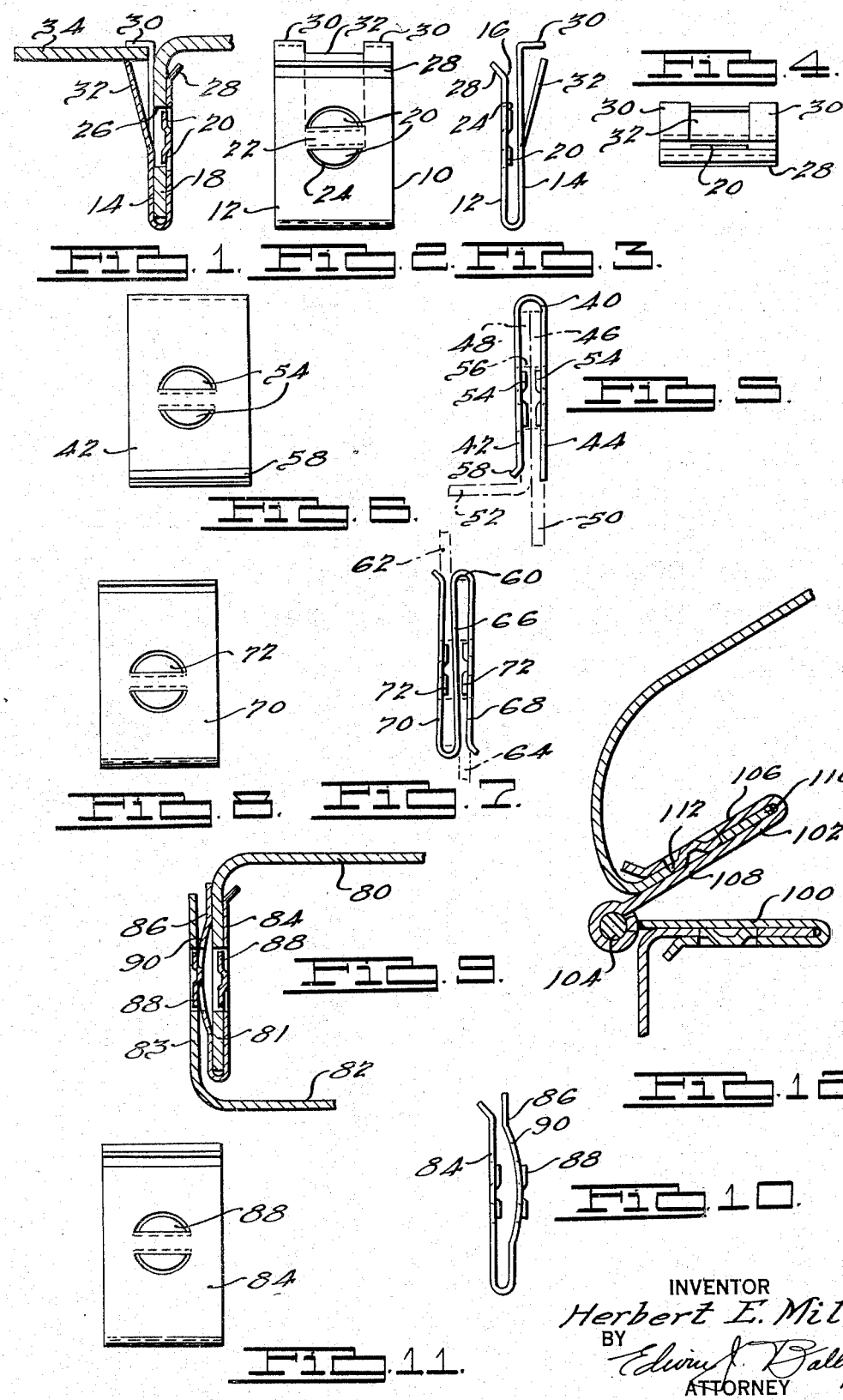
INVENTOR
Herbert E. Mills.
BY
Edward J. Balluff
ATTORNEY Patented Feb. 13, 1945

2,369,480

UNITED STATES PATENT OFFICE 2,369,480

THREADLESS FASTENING DEVICE

Herbert E. Mills, Cleveland, Tenn.

Application December 24, 1941, Serial No. 424,217

11 Claims. (Cl. 24—259)

This invention relates to fastening devices and has particular application to a threadless fastening device for securing parts such as sheet metal parts together.

A principal object of the invention is to provide a fastening device for securing panels, flanges, brackets, sheet-like pieces, and the like together and which device is adapted to be connected to the pieces to be secured together with a minimum amount of time and effort.

Another object of the invention is to provide a fastening device of the character herein disclosed which is simple in construction, dependable in operation, and efficient in that it reduces the time for assembling the fastening device to the work piece.

Another object of the invention is to provide a novel and inexpensive fastening means for conveniently and cheaply fastening work pieces together.

Other objects and advantages of the invention will be apparent from a consideration of the following specification taken in conjunction with the accompanying drawing, of which there is one sheet and wherein:

Fig. 1 is a sectional view illustrating one embodiment of the invention and an application thereof;

Fig. 2 is a face elevational view of the fastening device illustrated in Fig. 1;

Fig. 3 is a side elevational view of the device as illustrated in Fig. 2;

Fig. 4 is a plan view of the device illustrated in Fig. 2;

Fig. 5 is a side elevational view of a modification;

Fig. 6 is a face elevational view of the embodiment illustrated in Fig. 5;

Fig. 7 is a side elevational view of a further modification;

Fig. 8 is a face elevational view of the device illustrated in Fig. 7;

Fig. 9 is a sectional view illustrating an application of another embodiment of the invention;

Fig. 10 is a side elevational view of the device illustrated in Fig. 9 from the reverse side thereof;

Fig. 11 is a face elevational view of the device illustrated in Fig. 10; and

Fig. 12 is a sectional view illustrating another modification of the invention as embodied in a hinge.

Referring now to Figs. 1 to 4, the fastening device therein illustrated comprises a sheet metal clip 10 having spaced leg portions 12 and 14. The metal of which the device is made is a spring metal such as spring steel and the leg portions 12 and 14 are adapted to assume the form illustrated in Fig. 3. The leg portions 12 and 14 are connected at one end so as to form a U-shaped clip and the upper end 16 of the leg 12 preferably is spaced closer to the opposite part of the leg 14 than the spacing between the legs at the bottom so that when the clip is arranged on a flange such as that illustrated at 18 in Fig. 1, the legs or leg portions 12 and 14 will clamp the flange 18 therebetween. The spacing between the legs 12 and 14 should closely approximate the thickness of the gauge of the metal of the flange 18. The leg 12 is formed to provide a projection which, as illustrated, comprises two semi-circular parts 20 which are offset from the inside face of the leg 12. The parts 20 are preferably formed by bumping or pressing the parts 20 out of the leg 12, and are connected thereto by a strip or bridge 22. The outer perimeter or edges 24 of the parts 20 provide a shoulder or seat which is adapted to cooperate with a complementary shoulder or seat 26 formed in the flange 18 by an aperture therein. As illustrated, the aperture in the flange 18 may be circular in shape and hence provide the circular seat or shoulder 26 which is adapted to cooperate with the cylindrical shoulder 24 formed by the parts 20 so as to prevent separation of the fastening device 10 from the flange 18. The aperture in the flange 18 should not be materially larger than the size of the projection provided by the parts 20. The open end of the leg 12 may be bent outwardly as indicated at 28 so as to facilitate the insertion of the flange 18 into the slot formed by the legs 12 and 14. When the fastening device is inserted on the flange 18 the legs 12 and 14 at their open end are sprung apart sufficiently for the projection 20 to clear the flange 18, and as soon as the projection 20 is lined up with the aperture which forms the seat 26, the projection 20 will, due to the characteristics of the clip, snap into position, as illustrated in Fig. 1, in the opening which provides the shoulder 26.

Means integral with one of the legs 12 or 14 are provided for securing the fastening device to another work piece and as illustrated in Fig. 1, comprise a pair of flanges 30 formed at the open end of the leg 14 and a prong 32 bent outwardly of the leg 14 between the flanges 30. The edge of a sheet-like piece 34 is adapted to be received between the end of the prong 32 and the flanges 30, as illustrated in Fig. 1, for securing the fastening device to the piece 34 thereby securing the piece on which the flange 18 is formed to the piece 34.

In the modification disclosed in Figs. 5 and 6, the spring clip 40 comprises two leg portions 42 and 44 arranged in the form of a U and adapted to receive in the space therebetween the edge portions 46 and 48 of two sheet metal members indicated at 50 and 52. Each of the leg portions 42 and 44 is provided with an offset projection 54 similar to the projection 20 and which is adapted to engage in an aperture or opening 56 formed in the edge portions 46 and 48. In this case the space between the leg portions 42 and 44 is sufficient to accommodate the edge portions of two pieces of metal and will prevent relative movement in all directions between the sheet metal parts 50 and 52. In a direction normal to the contacting surfaces of the edge portions 46 and 48, the spring tension of the clip will resist separation of the parts 50 and 52, while in any direction parallel to the engaged surfaces of the edge portions 46 and 48 the projections 54 will positively prevent relative movement between the parts 50 and 52 up to the shear point of the metal of which the clip 40 is formed. The open end of the leg 42 may be bent outwardly as at 58 to facilitate the arrangement of the clip 40 on the edge portions of the parts 50 and 52 and during assembly the open end of the legs 42 and 44 are sprung apart so that the projections 54 may clear the metal of the parts 50 and 52 until they are lined up with the apertures 56.

In the modification illustrated in Figs. 7 and 8, the clip 60 is made in the form of an S and is provided for connecting two substantially continuous panels 62 and 64 together. In this modification the intermediate leg 66 is adapted to lie between the edge portions of the panels 62 and 64, which are illustrated in dotted lines. The outer legs 68 and 70 are adapted to be arranged outwardly of the edges of the panels 62 and 64 and to cooperate with the leg 66 to provide slots for receiving such edges. In this case the legs 68 and 70 are provided with projections 72 like the projections 20 in Fig. 1, which are adapted to enter openings formed in the edges of the panels 62 and 64 for securing the same against separation.

In the modification illustrated in Figs. 9, 10 and 11, the fastening device is particularly suitable for securing two parts 80 and 82 together, the parts comprising, for example, the inner and outer panels of a door having flanges 81 and 83 respectively which are fitted one within the other. The panels 80 and 82 are prevented from moving relative to each other in a direction normal to the opposed surfaces of the flanges 81 and 83 by similar flanges formed on the opposite side of the panels 80 and 82. The fastening device comprises legs 84 and 86 spaced apart and each provided with a projection 88 like that illustrated at 20 in Fig. 1, and adapted to enter complementally shaped openings formed in the flanges 81 and 83. The projection 88 on one of the legs 86 may be formed on a bowed-out portion 90 of the leg 86, the bowed-out portion 90 functioning as a resilient spacer between the flanges 81 and 83. In this modification the fastening device may be assembled initially to the flange 81 and thereafter the panel 80 may be inserted in the panel 82 so as to bring the projection 88 on the leg 86 in line with the opening in the flange 83. The bowed-out part 90 of the leg 86 permits the projection 88 to be bent out of its normal position so as to clear the flange 83 until the projection 88 becomes aligned with the opening in such flange.

In the modification illustrated in Fig. 12, the application of my invention to a hinge is illustrated. The hinge comprises the leaves 100 and 102 pivotally joined in a conventional manner at 104. Each leaf comprises a construction similar to that illustrated in Fig. 1, for example, without the prong 32 or flanges 30, and includes spaced legs 106 and 108 adapted to receive the edge 110 of a panel therebetween. The leg 106 is provided with a projection 112 like the projection 20, and which is adapted to engage in an opening formed in the flange 110 for securing the hinge leaf 102 to the flange 110.

In all of the modifications illustrated, the clip is made of spring stock so that one of the legs thereof may be bent relative to the other leg of the clip so as to insert an edge of a piece in the clip and to clear the projection formed on one of the legs. Each clip may be formed to have one or more projections, such as the projections 20, formed on one or both of the legs thereof, and it is, of course, contemplated that such number of these fastening devices will be used as may be necessary to secure the various parts of the assembly together. The fastening devices may be spaced at various intervals, depending upon the load they have to carry. When assembled the fastening devices may be released by springing the leg portion carrying the projection 20 away from the panel or part in which the opening is provided.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. A threadless fastening device for securing together two pieces such as sheet metal panels, flanges, and the like comprising a U-shaped clip of spring metal having spaced leg portions, and adapted to accommodate between said leg portions a sheet-metal-like piece having a seat thereon, said leg portions being formed integrally from a single piece of stock, one of said leg portions having an integral substantially plane offset projecting toward the other of said leg portions and cooperable with said seat of said piece which is arranged between said leg portions for securing said fastening device against separation from said piece without the aid of screws, said offset having a free circumjacent edge, the engageable surfaces of said seat and said edge of said offset being disposed normal to the planes of said piece and said one leg portion so that tension in any direction parallel to and in the planes of said one of said leg portions and said piece, and between said seat and offset will not tend to disengage said surfaces, said seat and offset being held in cooperative relationship by the spring pressure of the leg portions of said clip, said fastening device being separable from said piece by moving said leg portion having said offset thereon away from said piece so as to permit movement in opposite directions in said parallel planes between said clip and said piece, and means provided on the other of said leg portions by means of which said fastening device may be secured to a part to which said piece is thereby assembled.

2. A threadless fastening device for securing together two pieces such as sheet-metal-like panels, flanges, and the like comprising a U-shaped clip of spring metal having spaced leg portions connected at one end, and adapted to accommodate between said leg portions a sheet-like piece having a seat thereon, one of said leg portions having an integral offset projecting toward the other of said leg portions and engageable with said seat of said piece which is arranged between said leg portions for securing said fastening device against separation from said piece, said leg portions functioning due to the spring pressure of said clip to hold said offset in engagement with said seat, even though tension, in a direction parallel to and in the plane of said leg portions and said piece, exists between said clip and said piece, and means provided on the other of said leg portions by means of which said fastening device may be secured to a part to which said piece is thereby assembled, said means comprising a laterally extending flange and a prong adapted to receive the edge of said part therebetween.

3. A threadless fastening device comprising a U-shaped sheet metal spring clip having spaced leg portions, said leg portions being formed integrally from a single piece of stock, one of said leg portions having an offset projection extending toward the other of said leg portions and adapted to seat in an aperture or recess formed in a piece which is arranged in the space between said leg portions, said leg portions functioning to resiliently hold said projection in said aperture or recess, the other of said leg portions being provided with a similar projection adapted to engage in an aperture or recess formed in another piece, said last-mentioned projection being formed on a bowed-out part of said other of said leg portions which is adapted to be disposed between said pieces.

4. A threadless fastening device comprising a spring clip having spaced leg portions each of which is provided with a laterally extending offset projection which is adapted to engage in a recess formed in a pair of sheet-like pieces for thereby securing said pieces together, said leg portions being formed integrally from a single piece of stock, said leg portions being adapted to receive the edge of at least one of said pieces therebetween and being formed in the shape of a letter S.

5. A threadless fastening device for sheet metal panels, flanges, and the like comprising a clip of spring metal having spaced substantially parallel leg portions adapted to accommodate therebetween a pair of sheet-metal-like pieces, each of said sheet-metal-like pieces and leg portions having a shoulder thereon, said leg portions being formed integrally from a single piece of stock, the said shoulders on said leg portions being engageable with said shoulders on said pieces for securing said fastening device against separation from said pieces so as to secure said pieces together thereby, the interengageable surfaces of said shoulders being disposed normal to the planes of said pieces and leg portions so that tension in any direction parallel to and in the planes of said leg portions and said pieces and between said shoulders will not tend to disengage said shoulders, said leg portions functioning, due to the spring pressure of said clip, to hold said shoulders against separation in a direction transverse of the direction in which said shoulders prevent separation between said clip and said pieces, said shoulders on said leg portions projecting toward each other.

6. A threadless fastening device for securing together two pieces such as sheet metal panels, flanges and the like, said device comprising a U-shaped sheet metal spring clip having spaced leg portions, said leg portions being formed integrally from a single piece of stock, one of said leg portions having an offset projection adapted to seat in an aperture or recess formed in a piece which is arranged in the space between said leg portions and the other of said leg portions functioning due to the spring pressure of said clip to resiliently hold said projection in said aperture or recess, said projection comprising a pair of semi-circular members having their curved edges presented away from each other and integrally connected to said one of said leg portions, said clip having other means by which it and said piece secured thereto may be secured to another piece.

7. A threadless fastening device for securing together two pieces such as sheet metal panels, flanges and the like, said device comprising a U-shaped sheet metal spring clip having spaced and generally parallel leg portions, said leg portions being formed integrally from a single piece of stock, part of one of said leg portions being embossed to form a substantially plane offset adapted to project into an aperture formed in a piece which is arranged in the space between said leg portions, said leg portions due to the spring pressure of said clip functioning to hold said offset in said aperture, the interengageable surfaces of said aperture and offset being disposed normal to the plane of that portion of said piece which is arranged in said space between said leg portions so that tension in any direction parallel to and in the planes of said leg portions and said piece and therebetween will not disengage or tend to disengage said offset from said aperture, said clip having other means by which it and said piece secured thereto may be secured to another piece.

8. A threadless fastening device for securing together two pieces such as sheet metal panels, flanges and the like comprising a U-shaped clip of spring metal having spaced leg portions connected together only at one end, and adapted to accommodate between said leg portions a sheet-metal-like piece having a seat thereon, said leg portions being formed integrally from a single piece of stock, one of said leg portions having an integral offset substantially plane part projecting toward the other of said leg portions and engageable with said seat of said piece which is arranged between said leg portions for securing said fastening device against separation from said piece, the interengageable surfaces of said part and seat being disposed normal to the plane of that portion of said piece which is arranged in said space between said leg portions so that tension in any direction in the plane of said part and between said seat and part will not tend to disengage said surfaces, said seat and part being held in cooperative relationship by the spring pressure of the leg portions of said clip, said clip having other means by which it may be secured to another piece of material, said offset part being arranged substantially parallel to said leg portions.

9. A threadless fastening device for securing together two pieces such as sheet metal panels, flanges and the like, comprising a U-shaped clip of spring metal having spaced leg portions connected together at one end, and adapted to accommodate between said leg portions a sheet-metal-like piece having a seat thereon, said leg portions being formed integrally from a single piece of stock, one of said leg portions having an integral offset substantially plane part projecting toward the other of said leg portions and cooperable with said seat of said piece which is arranged between said leg portions for securing said fastening device against separation from said piece, said offset part being of substantially the same thickness as said leg portions, the engageable surfaces of said part and seat being disposed normal to the plane of that portion of said piece which is arranged in said space between said leg portions so that tension, in any direction parallel to and in the planes of said one of said leg portions and said piece, and between said seat and part, will not tend to disengage said surfaces, said seat and part being held in cooperative relationship by the spring pressure of the leg portions of said clip, said fastening device being separable from said piece by moving said leg portion having said offset part thereon away from said piece and by relatively moving said clip and said piece in opposite directions in said parallel planes, said clip having other means by which it may be secured to another piece of material.

10. A threadless fastening device for securing together two pieces such as sheet metal panels, flanges and the like comprising a U-shaped clip of spring metal having spaced leg portions connected at one end and adapted to accommodate between said leg portions a sheet-metal-like piece having a shoulder thereon, said leg portions being formed integrally from a single piece of stock, one of said leg portions having a shoulder engageable with said shoulder on said piece which is arranged between said leg portions for securing said fastening device against separation therefrom, one of said shoulders comprising an embossment projecting from the surface of the member on which it is arranged and toward the member on which the other of said shoulders is arranged, said other leg portion functioning, due to the spring pressure of said clip, to hold said piece and said one of said leg portions against separation in a direction transverse of the direction in which said shoulders function, one of said shoulders being arranged in surrounding relation to the other of said shoulders, the engageable surfaces of said shoulders being disposed normal to the planes of said piece and said one of said leg portions so that tension, in any direction parallel to and in the planes of said one of said leg portions and said piece, and between said shoulders will not tend to disengage said surfaces thereof, said shoulders being held in cooperative relationship by the spring pressure of the leg portions of said clip, said clip having other means by which it may be secured to another piece of material.

11. A threadless fastening device for securing together two pieces such as sheet metal panels, flanges and the like comprising a clip of spring metal having spaced substantially parallel leg portions adapted to accommodate therebetween a pair of sheet-metal-like pieces, each of said sheet-metal-like pieces and leg portions having a shoulder thereon, said leg portions and shoulders thereon being formed integrally from a single piece of stock, the said shoulders on said leg portions being engageable with said shoulders on said pieces for securing said fastening device against separation from said pieces so as to secure said pieces together thereby, the interengageable surfaces of said shoulders being disposed normal to the planes of said pieces and leg portions so that tension in any direction parallel to and in the planes of said leg portions and said pieces and between said shoulders will not tend to disengage said shoulders, said leg portions functioning, due to the spring pressure of said clip, to hold said shoulders against separation in a direction transverse of the direction in which said shoulders prevent separation between said clip and said pieces.

HERBERT E. MILLS.